Dec. 18, 1945. D. DALIN 2,391,010
DAMPER AND SHUTTER FOR REGULATING THE PASSAGE OF MEDIUMS
Filed Dec. 12, 1942 2 Sheets-Sheet 1
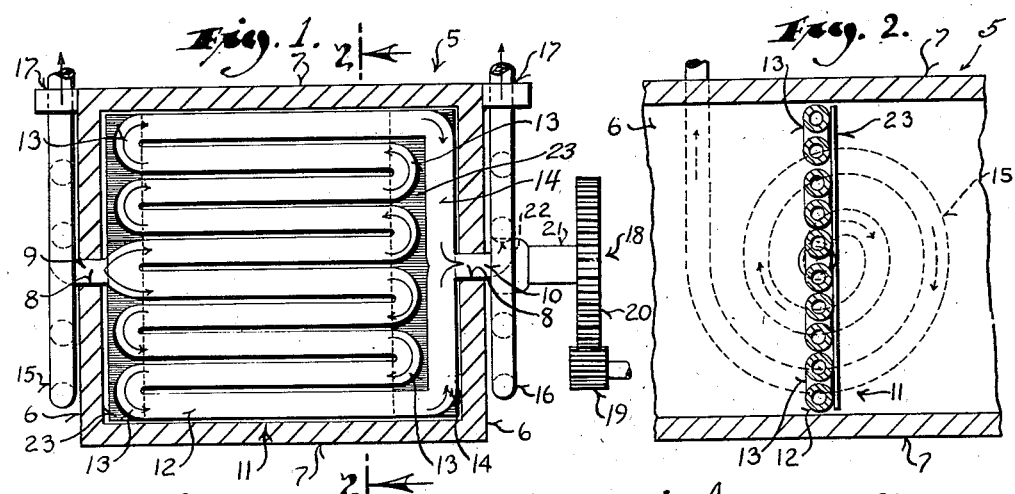
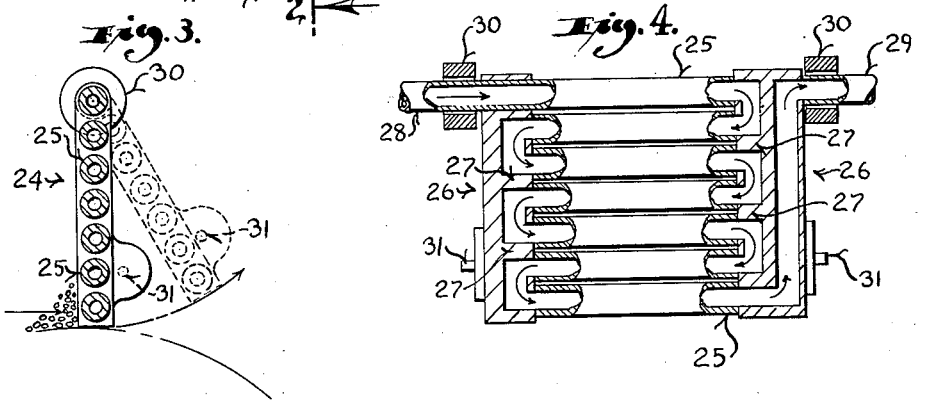
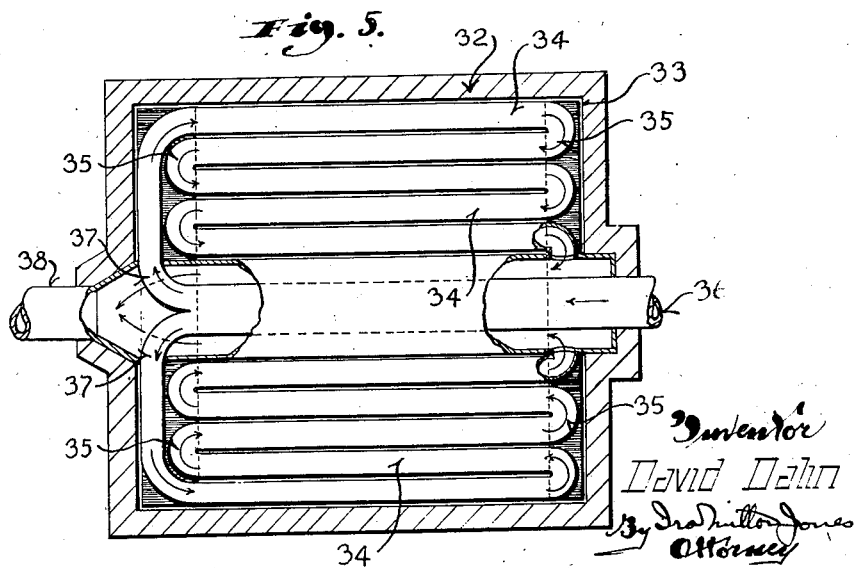
Inventor
David Dalin

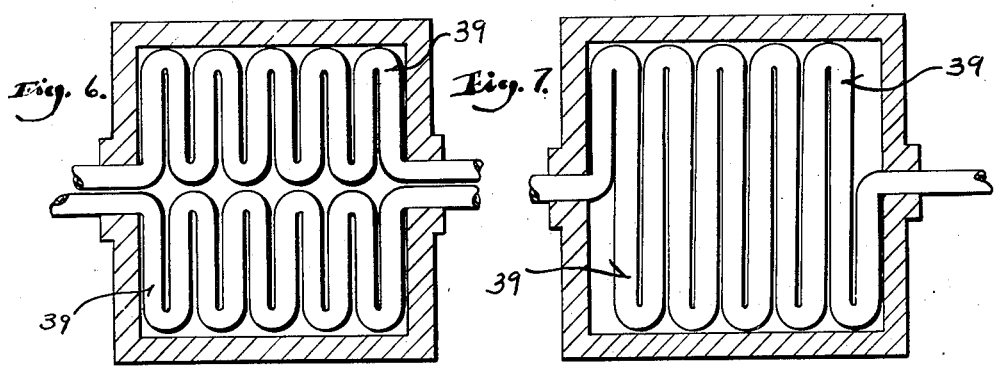
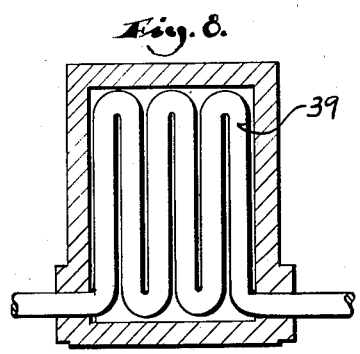
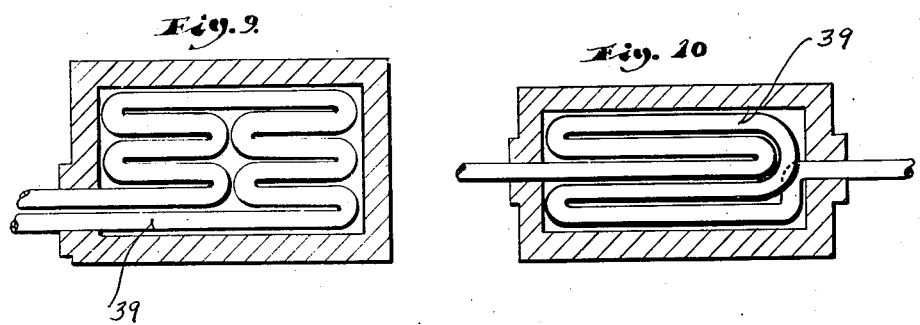

Patented Dec. 18, 1945

2,391,010

UNITED STATES PATENT OFFICE 2,391,010

DAMPER AND SHUTTER FOR REGULATING THE PASSAGE OF A MEDIUM

David Dalin, Sodertalje, Sweden

Application December 12, 1942, Serial No. 468,833
In Sweden September 15, 1941

5 Claims. (Cl. 126—285)

This invention relates to improvements in dampers and shutters, particularly for use in connection with boilers and furnaces for regulating the passage of a medium such as furnace gases through an opening or for regulating the height of a fuel layer or for serving the purpose of a slag or cinder scraper. Due to the excessive heat to which dampers and shutters of this type are subjected, they are designed to be cooled by circulating a suitable fluid coolant through fluid passages formed therein.

To enable the damper or shutter of this invention to withstand the excessive heat to which it is subjected in use, and as more specifically described in the copending application, Serial No. 498,697, filed August 14, 1943, it is designed and constructed to have a suitable fluid coolant circulated through defined passages therein. In this manner the cooling medium, whatever it may be, constantly flowing through the passages of the damper or shutter, carries away heat and guards against having the dampers or shutters burn out.

However, inasmuch as these dampers or shutters must be movable to effectuate their purpose a serious problem resides in providing a suitable secure connection between the inlet and outlet ends of the damper or shutter passages and the stationary elements of the coolant circulating system. Stuffing boxes and similar expedients heretofore used for this purpose are a constant source of trouble, especially when a liquid or gaseous medium of high temperature and under heavy pressure is used as the coolant. Great damage and expense has been and can be caused by the inevitable leakage of the cooling medium through such stuffing boxes.

It is therefore an object of this invention to provide an improved manner of connecting the inlet and outlet of the fluid passages of the damper or shutter with stationary feed and return lines, by which all of the objections and difficulties of past expedients, such as stuffing boxes, heretofore used for this purpose are eliminated.

More specifically it is the purpose of this invention to provide inlet and outlet ducts formed of material capable of withstanding the excessively high temperatures and pressures involved, connected between the fluid passages of the damper or shutter and the stationary elements of the coolant circulating system, which ducts have extensions or portions thereof so shaped as to provide sufficient resilient flexibility to enable the damper or shutter to be swung back and forth about a fixed axis far enough to effect the desired adjustment without the use of stuffing boxes or the like.

To this end it is an object of this invention to provide spirally arranged tubes securely fixed at the centers of the spiral to the inlet and outlet ducts extended from the ends of the fluid passages in the damper or shutter so that the damper or shutter may be swung around an axis substantially in line with its inlet and outlet ducts, the spiral shape of the tubes providing the necessary flexibility even though the tubes are made of metal capable of withstanding the high heat and pressure involved, and the ends thereof are firmly fixed, by welding or the like, to the inlet and outlet ducts of the damper or shutter and to the stationary feed and return lines of the coolant circulating system.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which:

Figure 1 is a plan view of a damper embodying this invention;

Figure 2 is a cross sectional view of the damper shown in Figure 1, said view being taken on the plane of the line 2—2 in Figure 1;

Figures 3 and 4 are cross sectional and plan views respectively of another type of damper to which this invention applies;

Figure 5 is a plan view similar to Figure 1 illustrating a modified construction of the damper; and Figures 6 to 10 inclusive are schematic views showing various ways of arranging the tubes or coolant passages in the damper.

Referring now particularly to the accompanying drawings, in which like numerals indicate like parts, and particularly to Figures 1 and 2, the numeral 5 indicates a passage or flue having side walls 6 and top and bottom walls 7. The side walls 6 have axially aligned holes 8 in which the journal portions 9 and 10 of a pivoted damper or shutter 11 are received. This damper or shutter comprises a plurality of adjacent tubes 12 connected at their ends by return bends 13 to provide a tortuous passage for a fluid cooling medium. In combination the tubes 12 form substantially a solid barrier which is symmetrical about the journal portions 9 and 10.

The journal portions 9 and 10 constitute the inlet and outlet ends respectively of the tortuous fluid passage, the inlet 9 being connected with the two centermost tubes of the barrier at one side edge thereof and the outlet 10 being connected with the two outermost tubes of the barrier at its opposite edge through a tube 14 normal to the axis of the barrier. As will be readily apparent, the entire area of the damper which is subjected to the gases flowing through the passage 5 may be cooled by circulating a suitable coolant through the tubes 12.

The journal portions 9 and 10, which provide the inlet and outlet of the fluid passage in the damper are respectively connected with the innermost ends of spiral tubes 15 and 16. The opposite ends of these spiral tubes are fixed as at 17 and connected with feed or return lines (not shown). The connection of the innermost ends of the spiral tubes 15 and 16 with the tubular journal portions 9 and 10 respectively are rendered permanently fluid-tight by welding or the like.

Thus, it will be seen that the use of stuffing boxes or their equivalent is obviated and the full swinging movement of the damper or shutter is enabled through the flexibility or resiliency of the spiral tubes 15 and 16.

Drive mechanism, indicated generally by the numeral 18, controls the position of said damper or shutter. This drive mechanism comprises a driving gear 19 meshing with a driven gear 20 fixed to a shaft 21. The shaft 21 is in turn secured as at 22 to the innermost end of the spiral tube 16 so that any rotation of the driven gear 20 flexes the spiral tube and swings the damper or shutter about its axis.

The tubes 11 of the barrier are held against relative displacement by plates 23 welded to the ends thereof. These plates also add to the completeness of the barrier by closing the spaces between the return bends 13 and the walls of the passage or flue; the plates being cooled by virtue of their connection with the tubes.

In the embodiment of the invention illustrated in Figures 3 and 4 the damper 24 swings from its upper edge so as to effectively regulate the height of a fuel layer by controlled disposition of its lower free edge. As before the damper is made up of a plurality of tubes 25 connected at their ends by headers 26 provided with partitions 27 so that the tubes and headers cooperate to provide a serpentine fluid passage. Axially aligned inlet and outlet ducts 28 and 29 respectively provide for the flow of a coolant to and from the fluid passage. These inlet and outlet ducts are journalled in bearings 30 and like the journal portions 9 and 10 (Figures 1 and 2) are welded or otherwise secured to the inner ends of spiral tubes (not shown) but similar to the spiral tubes 15 and 16.

Pins 31 projecting from the sides of the damper provide for the attachment of links (not shown) by which the position of the damper may be adjusted.

The construction shown in Figure 5 is also usable as a slag scraper, as will be readily apparent.

In the construction illustrated in Figure 5 the damper 32 is centrally pivoted as in Figures 1 and 2 to control the flow through a passage 33 which however may be a hole in a wall as distinguished from an elongated duct or passage. In any event the damper 32 comprises a plurality of tubes 34 parallel with the axis about which the damper swings. These tubes are connected at their ends by return bends 35 to form two sets of serpentine fluid passages, one at each side of the center. At the center the damper has an inlet duct 36 which enters the passage 33 through one side wall thereof, runs the width of the damper and branches into two tubes 37 each of which leads to the outer one of the two sets of tubes 34. The inner tubes of the two sets connect with an outlet duct 38 surrounding the inlet duct 36 and passing out through the opposite side wall of the passage 33.

As described in connection with Figures 1 and 2, the inlet and outlet ducts are connected to the inner ends of spiral tubes (not shown) the outer ends of which are fixed and connected to feed and return lines. Thus swinging adjustment of the damper 32 may be effected without need for objectionable stuffing boxes or the like.

In the several modifications shown in Figures 6 to 10 inclusive the damper is produced by variously arranged serpentine coils or tubes 39, but in all cases the inlet and outlet ends of these tubes are to be connected to their feed and return lines by spiral tubes so that the advantages of this invention will be realized.

Figure 6 shows two independent sets of serpentine coils each individually adjustable, or, if desired, adjustable in unison.

From the foregoing description, taken in connection with the accompanying drawings, it will be readily apparent to those skilled in the art that this invention provides an efficient, simple expedient for connecting the inlet and outlet ends of cooling fluid passages in adjustable dampers and shutters to their stationary feed and return lines whereby full adjustment of the damper or shutter is enabled without the use of stuffing boxes or similar unreliable constructions.

Having described my invention what I claim as new and desire to protect by Letters Patent is:

1. A fluid-cooled damper construction for controlling the flow of fluids through a defined passage comprising: a barrier of a size to substantially close said passage, said barrier having a tortuous fluid passage therein; axially aligned inlet and outlet ducts connected to said damper and passing through the walls of the passage; bearings in which said ducts are journaled to pivotally mount the damper; resilient spiral tubes having their inner ends connected to said inlet and outlet ducts for conducting a fluid cooling medium to and from said inlet and outlet ducts, said spiral tubes being arranged with the axes of their spirals substantially coaxial with the axially aligned inlet and outlet ducts; and means for rocking the barrier in said bearings against the tension of said spiral tubes.

2. A fluid-cooled damper construction for controlling the flow of fluids through a defined passage comprising: a plurality of adjacent tubes connected at their ends so as to form a tortuous passage for a fluid cooling medium and together forming a barrier to substantially close the passage; axially aligned inlet and outlet tubes at opposite edges of the damper and connected to said tubes, said inlet and outlet tubes passing through the adjacent walls of the passage; bearings in which said inlet and outlet tubes are journaled to enable pivotal adjustment of the damper;

resilient spiral tubes on the exterior of said passage having their inner ends connected to said inlet and outlet tubes for conducting a fluid cooling medium to and from said inlet and outlet tubes, said spiral tubes being arranged with the axes of their spirals coaxial with their respective inlet and outlet tubes; and means for adjusting the damper about the axis of its inlet and outlet tubes against the spring tension of said spiral tubes.

3. A fluid-cooled damper construction for controlling the flow of fluid medium through a defined passage comprising: a group of tubes arranged in serpentine fashion and together forming a barrier of a size to substantially close the passage; frame members embracing the looped ends of the tubes to coact with the tubes in effecting a closure for the passage; axially aligned inlet and outlet tubes connected to said serpentine-arranged tubes at opposite edges of the damper; bearings in which said inlet and outlet tubes are journaled to pivotally mount the damper for adjustment; means for adjusting the damper; and resilient spiral coils on the exterior of the passage connected at their centers to said inlet and outlet tubes and disposed substantially in planes normal to the axis of said inlet and outlet tubes to provide means for conducting a cooling fluid medium to and from said inlet and outlet tubes.

4. A fluid-cooled damper construction for controlling the flow of fluids through a defined passage comprising a barrier of a size to substantially close said passage, said barrier having a tortuous fluid passage therein; inlet and outlet ducts for said fluid passage extending from the barrier to the exterior of the passage; means mounting the barrier for rocking movement about an axis substantially coaxial with the protrusion of the inlet and outlet ducts to the exterior of the passage; a resilient spiral tube on the exterior of the passage having its inner end at the center of the spiral connected to the inlet duct; a second resilient spiral tube on the exterior of the passage having its inner end at the center of the spiral connected to the outlet duct; said resilient spiral tubes being arranged with the planes of the spirals substantially normal to the axes of the inlet and outlet ducts; and means for rocking the barrier against the tension of the spiral tubes to adjust its effectiveness to close the passage.

5. An adjustable fluid cooled barrier for use in locations subjected to excessively high temperatures such as those prevailing in furnaces of steam boilers, comprising: a plurality of interconnected tubes collectively forming the barrier and providing fluid passages for the circulation of a fluid coolant to absorb and carry off heat from the walls of the barrier; means mounting the barrier for rocking adjustment about a fixed axis; inlet and outlet ducts for the fluid passages of the barrier extending from the barrier substantially at and in the direction of said fixed axis; two tubes of substantial length, each capable of withstanding high temperatures and pressures, one joined to the inlet duct and the other joined to the outlet duct so as to form extensions thereof, the ends of said two tubes remote from their junctures to the inlet and outlet ducts being fixed for attachment to feed and return lines and their portions between their ends being arranged convolutely about said fixed axis to provide resiliency enabling rocking adjustment of the barrier; and means for effecting rocking adjustment of the barrier against the resiliency of said two tubes.

DAVID DALIN.